US005645745A

United States Patent [19]
Hartwick et al.

[11] Patent Number: 5,645,745
[45] Date of Patent: Jul. 8, 1997

[54] CIRCUIT AND CONTROL METHOD FOR ELECTRICALLY HEATING A CATALYST

[75] Inventors: Larry R. Hartwick, Rochester Hills; Anson Lee, St. Clair; Jan S. Pyko, Bloomfield Township; Bruce H. Teague, Grosse Pointe Park, all of Mich.

[73] Assignee: Chrysler Corporation, Auburn Hills, Mich.

[21] Appl. No.: 299,985

[22] Filed: Sep. 2, 1994

[51] Int. Cl.$^6$ .................................................. H05B 1/02
[52] U.S. Cl. .................. 219/497; 219/202; 219/205; 219/506; 219/519; 219/508; 123/434; 123/179.28; 322/7; 60/300
[58] Field of Search .................................. 219/201–206, 219/497, 506, 501, 481, 519, 508; 123/691, 179 R, 434, 179.28; 322/7, 90; 60/276, 277, 284, 300

[56] References Cited

U.S. PATENT DOCUMENTS

| | | | |
|---|---|---|---|
| 4,033,133 | 7/1977 | Houseman et al. | 60/606 |
| 4,188,527 | 2/1980 | Follmer | 219/202 |
| 4,267,433 | 5/1981 | Sahm, III | 219/491 |
| 4,277,672 | 7/1981 | Jones | 219/497 |
| 4,611,562 | 9/1986 | Nakano et al. | 123/440 |
| 5,066,866 | 11/1991 | Hallidy | 290/1 R |
| 5,068,589 | 11/1991 | Offiler et al. | 322/7 |
| 5,072,098 | 12/1991 | Matthews et al. | 219/501 |
| 5,155,995 | 10/1992 | Kinnear et al. | 60/300 |
| 5,163,290 | 11/1992 | Kinnear | 60/274 |
| 5,204,066 | 4/1993 | Fumio et al. | 422/174 |
| 5,224,335 | 7/1993 | Yoshizaki | 60/300 |
| 5,261,230 | 11/1993 | Yuuki et al. | 60/276 |
| 5,265,418 | 11/1993 | Smith | 60/284 |
| 5,321,231 | 6/1994 | Schmalzriedt et al. | 219/497 |
| 5,397,991 | 3/1995 | Rogers | 324/434 |

OTHER PUBLICATIONS

Alternator powered, electrically heated catalyst/By Paul M. Laing/Ford Motor Company/Published in Automotive Engineering/Apr. 1994.
Cleaner Starts for the Catalytic Converter/By Jim Motavalli/Published in the New York Times, Sunday, Sep. 11, 1994.

*Primary Examiner*—Mark H. Paschall
*Attorney, Agent, or Firm*—Mark P. Calcaterra

[57] ABSTRACT

In an engine exhaust system including a DC power source, an apparatus and method for electrically heating a catalyst, the apparatus comprising a multi-phase AC alternator in electrically operable relation to the DC power source, the AC alternator rectifying the AC to DC by a diode rectifier bridge. A device for switching power supplied from the multi-phase AC alternator to the battery to the electrically heated catalyst, the relay device in electrically operable relation with the multi-phase AC alternator. An electrically heated catalyst in electrically operable relation with the switching device is also provided, the catalytic converter including a catalyst for purifying exhaust gases of the engine and a heating element for bringing the catalytic converter expediently within peak operating temperature. The invention further includes a device for energizing and de-energizing the switching device, the energizing and de-energizing device in electrically operable relation with the switching device.

18 Claims, 2 Drawing Sheets

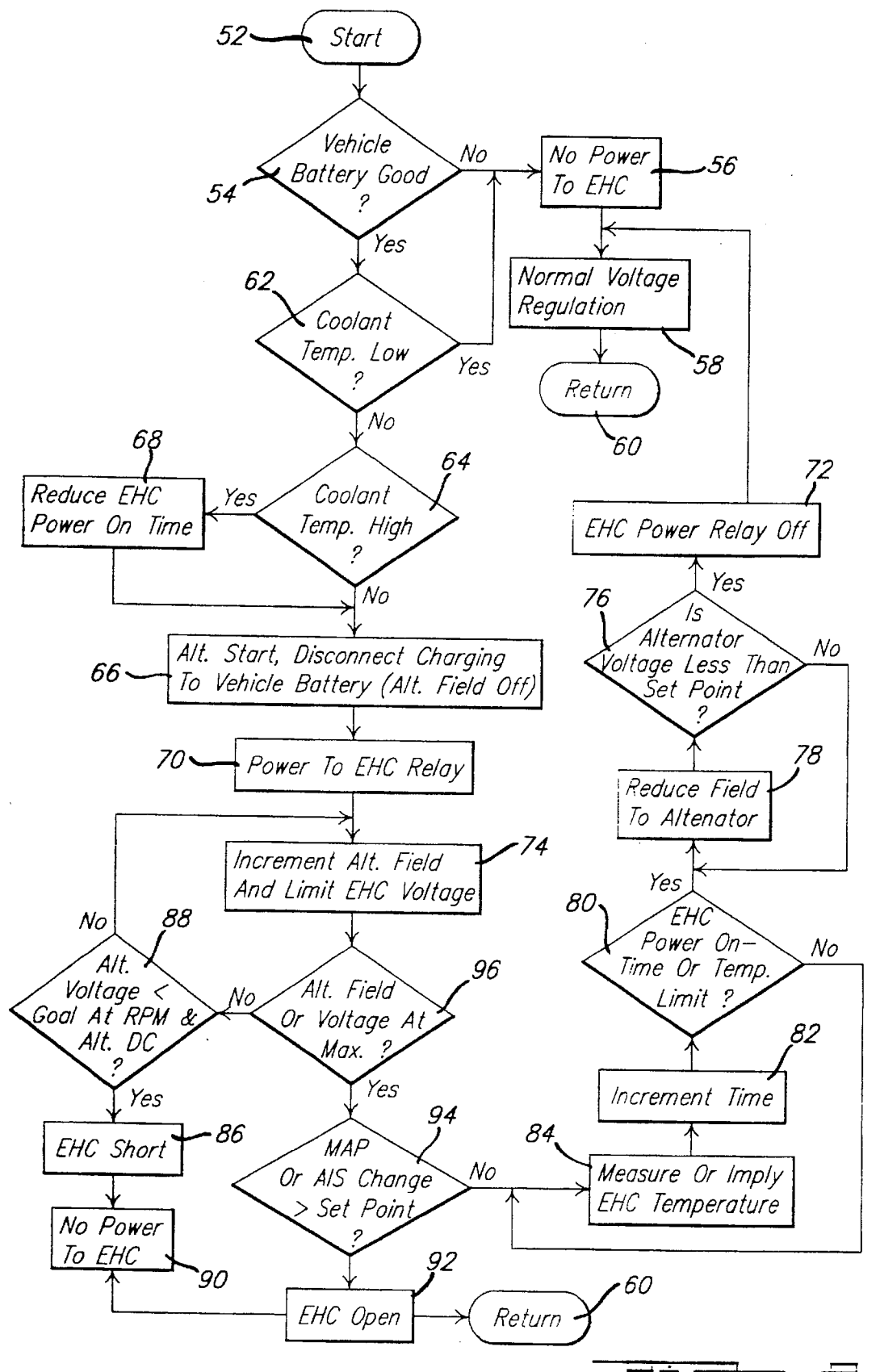

CIRCUIT AND CONTROL METHOD FOR ELECTRICALLY HEATING A CATALYST

BACKGROUND OF THE INVENTION

1. Field of the Invention

The present invention relates generally to engine exhaust systems. In particular, to a circuit and control strategy method of providing power to an electrically heated catalyst without the inefficient exchange of energy between the engine battery and alternator.

2. Description of the Related Art

Typical vehicles have a catalyst placed downstream of the exhaust manifold in the exhaust system. One of the main purposes of the catalyst is to provide a means of purifying hydrocarbon and carbon monoxide emissions which may emanate from the engine. To perform such purification, most catalysts must be heated to a high temperature to reach optimal purification performance. This requires a waiting period approximately equal to the time required for the engine to reach a "warmed up" or steady state operating condition. The catalyst is thereby brought within operating temperature by the heat of the exhaust emanating from the engine. In addition, engines may sometimes run rich during warm-up. This further inhibits purifying reactions since an adequate supply of oxygen is not present. By the time the catalyst temperature has reached operating level, hydrocarbon emissions may have escaped the engine exhaust system without being fully purified.

Prior engine exhaust systems, which have implemented electrically heated catalysts, have not dealt effectively with real world power constraints. Engine batteries and start capacitors have been used to supply power directly to the catalyst. This has resulted in undue power strain being placed on the battery.

It is therefore desirable in the art of engine exhaust systems to provide a method and apparatus which will quickly bring a catalyst within a peak operating range soon after the engine is started without producing undue strain on the engine battery.

SUMMARY OF THE INVENTION

In light of such desirable characteristics, not fully present in the related art, the present invention consists of a circuit and control strategy method of providing power to a catalytic heating element without the inefficient exchange of energy between the engine battery and alternator.

In an engine exhaust system including a DC power source, an apparatus and method for electrically heating a catalyst. The apparatus comprises a multi-phase AC alternator electrically coupled to the DC power source, the AC alternator rectifying the AC to DC by the use of a diode rectifier bridge. A device for switching power from the multi-phase AC alternator to the catalyst is provided. The switching device is electrically coupled to with the multi-phase AC alternator. An electrically heated catalytic converter electrically coupled to the switching device is also provided, the catalytic converter including a catalyst for purifying exhaust gases of the engine and a heating element for bringing the catalytic converter expediently within peak operating temperature. The invention further includes a device for energizing and de-energizing the switching device, the energizing and de-energizing device electrically coupled to the switching device.

One advantage of the present invention is for providing a circuit and method which brings a catalyst within peak operating range expediently. A further advantage is that the power required by the present invention is supplied by a standard engine alternator. No extra battery power source is needed. The use of an alternator will also provide greater power at elevated voltage levels. The higher voltage supply allows for lower current levels. This decreases the size and amount of internal wiring.

The present invention further provides the advantage of disconnecting the alternator output from the engine battery during catalyst heating, enabling the alternator output voltage to be different than the nominal battery voltage.

Moreover, the present invention provides for a matching of load impedance on the alternator resulting from the catalyst heater to the alternator's internal impedance. This provides maximum circuit efficiency. In addition, the present catalyst system provides for "soft switching" of a high current switching means.

Another advantage of the present invention is that the circuit and control method ensure sufficient heating of the catalyst without degrading the engine's idle quality, electrical system, or operating capabilities.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 2 is a flow chart of a method for a catalyst performance control system of the present invention.

DESCRIPTION OF THE PREFERRED EMBODIMENT(S)

Figure 1:
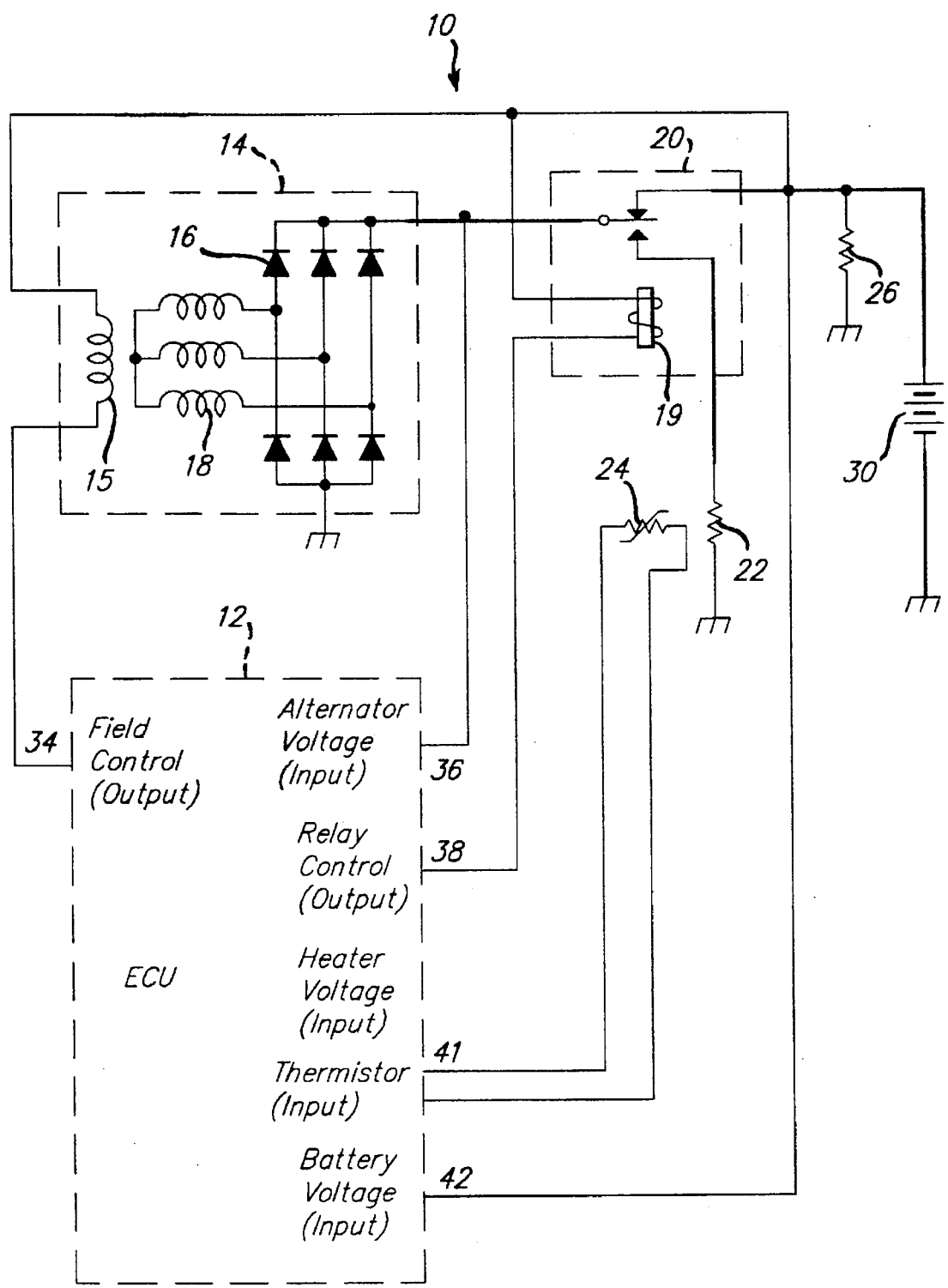
FIG. 1 is a schematic view of an electronic circuit of the present invention.

Referring now to FIG. 1, a catalyst performance control system 10 is shown. The catalyst control system 10 includes an engine controller or Electronic Control Unit (ECU) 12 and an engine exhaust system (not shown). The ECU 12 includes a microprocessor, memory (not shown), bus lines (address, control, and data), and other hardware such as pressure, temperature, and speed sensitive sensors, and a methodology (to be described in conjunction with FIG. 2 below) needed to perform the task of engine control. The catalyst control system 10 also includes an alternator 14 for generating a three-phase alternating current and a means of rectifying the alternating current to direct current. The catalyst control system 10 further includes means for energizing and de-energizing the relay means.

The alternator 14 has two input lines between which is connected a field winding 15. One input is connected to an input of a relay 20 and the battery voltage input 42 of the ECU 12. The other alternator input is interconnected to a field control output 34 of the ECU 12. The alternator 14 further comprises phase windings 18 for creating a three-phase alternating current. The phase windings 18 are interconnected in a "Y" fashion. It is to be expressly understood, however, that other inductor coil configurations are possible with the present invention such as a "delta" connection. The phase windings 18 are jointly connected on a first end and connected to a diode rectifier bridge 16 of the alternator 14 on a second end. The diode rectifier bridge 16 of the alternator 14 provides for rectification of the three-phase alternating current received from the alternator phase windings 18 to direct current. The diode rectifier bridge 16 is in communication with the alternator phase windings 18 and connected to the alternator output. The diode rectifier bridge 16, internal to the alternator, is also grounded. The alternator 14 further has an output for transferring power to a relay 20. The alternator output is also fed to the alternator voltage input 36 of ECU 12.

The catalyst performance control system 10 further includes relay means 20 for switching the direct current supplied by the output of the alternator 14 between various circuits within the catalyst control system 10. In the preferred embodiment, the relay means 20 is a power relay having a relay coil 19 connected across two of its inputs. It is to be understood that the relay means could also consist of a bi-polar or MOSFET transistor. The energizing and de-energizing of the relay 20 is supplied from the ECU 12 at relay control output 38.

The present relay 20 has three inputs. The first input is interconnected to the output of the alternator 14. A second input is connected to an input of the alternator 14 and a positive voltage side of battery 30. A third input of relay 20 is interconnected to the relay control output 38 of ECU 12. The power relay 20 further has two outputs. The first is interconnected to a positive voltage side of the battery 30 and engine loads 26. The second relay output is connected to the ECU 12 and an electrically heated catalyst 22. The electrically heated catalyst 22 is disposed within an exhaust passage of the engine and comprises a resistance element which can be heated by electrical power provided by the relay 20. A voltage reading of the electrically heated catalyst 22 can be taken by the ECU 12 which is connected to the heater 22 at heater voltage input 40.

A thermistor 24 for reading the temperature of the electrically heated catalyst is also included in the catalyst control circuit 10 having both inputs and outputs. The electrically heated catalyst 22 is in close proximity to the thermistor 24 for reading the temperature of the heater 22. The thermistor output is connected to a temperature sensor input 41 of ECU 12. The alternator output is read by the ECU 12 at alternator voltage input 36.

The present catalyst control circuit 10 includes engine loads 26 which manifest themselves in the form of resistance thereby resulting in a voltage drop across battery 30. The engine loads 26 may consist of such operating parts as an air conditioner, fan motor, power door locks, power antenna, radio and other electrically powered devices which a particular engine may come equipped. The loads 26 are connected at a first end to relay output and a second end to ground. The control system 10 further comprises a battery 30 for providing direct current (DC) to the catalyst control circuit 10. The battery has a positive voltage terminal and a negative voltage terminal. The positive voltage terminal is interconnected to the engine loads 26 and an output of the relay 20. The positive battery terminal is also read by the ECU 12 at battery voltage input 42. The negative terminal of the battery 30 is connected to ground.

The operation of the catalyst control circuit 10 is as follows. A typical engine charging system consists of an alternator and a voltage regulator. In the present inventions, the voltage regulation function is performed by the ECU 12. The alternator 14 generates a three-phase Alternate Current (AC), which is rectified to a Direct Current (DC) by the diode rectifier bridge 16 which is internal to the alternator 14. The DC is then applied to the battery 30 and the engine's electrical loads 26. Battery voltage is kept within the desired range by the voltage regulation, internal to the ECU 12, which monitors the battery voltage and adjusts the alternator field current through field winding 15 by field control output 34. The alternator output is also controlled along with the amount of current delivered to the battery 30 and engine loads 26.

During operation of the catalyst control circuit 10, the relay coil 19 is energized via the relay control signal from the relay control output 38 of ECU 12 thereby cutting off a current path from the alternator 14 to the battery 30 and all engine loads 26. At the same time, the current path from the alternator 14 to the electrically heated catalyst 22 is closed. Such an event enables all alternator power to be applied to the electrically heated catalyst 22. All electrical loads 26 of the engine are then supplied by battery 30. Subsequent to the start of the engine, the ECU 12 stops the current flowing through the field winding 15 of the alternator 14 by creating an open circuit via field control line output 34. When a minimum engine RPM is reached and the battery voltage is above a minimum threshold level, the relay coil 19 is energized by the ECU 12. This will redirect all alternator output from the battery 30 and the engine loads 26 to the electrically heated catalyst 22.

After a short time delay, the field current of the alternator's field winding 15 is increased such that the alternator's current output is increased. Such an event causes the heater voltage to ramp-up linearly from approximately 0 volts to a set level during a specified time interval. By implementing slow ramping of the current of the alternator field winding 15 and subsequently the alternator's output voltage and current, the torque required by the alternator 14 from the engine, to produce electrical power, will only increase gradually. This ramping will minimize the fluctuation of engine RPM. During such voltage ramping of the catalyst 22, its voltage is monitored by the ECU 12 through input readings from alternator voltage input 36. Such monitoring is carried out to determine whether it follows the required voltage stored in memory of the ECU 12. If the monitored value is not within a specified range, the entire electrically heated operating mode of the ECU 12 will be terminated. A fault code will then be set in memory of ECU 12 to indicate a shorted catalyst control circuit. In addition, by comparing various engine loads represented by sensor readings from the manifold absolute pressure (MAP), automatic idling speed (AIS), and others, before and after ramping voltage, an open electrically heated catalyst circuit can also be diagnosed.

If no faults were detected during the voltage ramping period, all alternator power will be delivered to the electrically heated catalyst 22 for a specified length of time. This heating time can be modified based on available engine information such as, but not limited to, time after short or open circuit, coolant temperature and catalyst temperature measurement. During operation of the catalyst control circuit 10, the heater voltage, battery voltage, and engine RPM are all monitored. If any of these three parameters drops below their respective specified limit, the circuit operation will be terminated and appropriate fault code will be set in memory of ECU 12.

To maintain the catalyst 22 within a heating and electrical range, the heater voltage is limited to a specified voltage level. This is done by controlling the duty cycle of the alternator current of field winding 15 by the ECU 12. After the heating time period expires, the current supplied to the field winding 15 is turned off. After a specified time has elapsed or the heater voltage drops below a set point, the relay coil 19 is de-energized by the ECU 12. This operation guarantees a "soft" opening of the contacts of relay 20. The relay de-energization disconnects the alternator power from the electrically heated catalyst 22 and at the same time restoring the connection between the alternator 14, battery 30, and engine loads 26. After a short delay, the alternator field control output 34 of the ECU 12 will return to its normal operation.

Referring now to FIG. 2, a methodology for a catalyst performance control system 50 is disclosed. The method begins or starts at block 52 and advances to decision block 54 whereby the methodology determines whether the battery 30 has sufficient voltage for supplying normal engine electrical functions. If the battery 30 does not have sufficient voltage the method advances to block 56 where power will be cut off to the electrically heated catalyst 22. The method then continues to block 58 where voltage regulation is applied to the alternator 14. The method then returns, in block 60, to perform other engine control tasks.

If, however, it is determined in block 54 that the battery 30 has sufficient voltage, the method falls to decision block 62. If it is determined in block 62 that the coolant temperature is below a specified threshold level, the method rises to block 56 where power is cut off to the electrically heated catalyst 22. The method then continues to block 58 where voltage regulation is applied to the alternator 14. The method then returns, in block 60, to perform other engine control tasks. If the coolant temperature is found to be sufficient in block 62, the method falls to decision block 64.

If the coolant temperature is determined to be high such that it is beyond a specified level, the method continues to block 68. In this block the methodology reduces the time that power is delivered to the electrically heated catalyst 22. The method then continues to block 66. If, however, the coolant temperature in block 64 is not higher than a specified level, the method falls directly to block 66. In this block the current supplied to field winding 15 is disabled by the field control output 34 of ECU 12. Such an occurrence will, at start, disconnect charging to the battery 30. The method then falls to block 70 whereby power is provided to the relay 20. The method then advances to block 74 where the voltage across field winding 15 is ramped or incremented.

Next, the methodology advances to decision block 96. If the method determines that the field winding 15 is not at maximum duty cycle, or alternator voltage is not at a set limit, it falls to block 88. In block 88 the method determines if the alternator voltage is less than the goal at engine RPM and the alternator duty cycle. If the answer is yes, the method advances to block 86. At this block, the method determines that the electrically heated catalyst 22 is shorted. The method then continues to block 90 where power is cut off to the electrically heated catalyst 22. The method then returns, in block 60, to perform other engine control tasks. Should the method determine that the alternator voltage is not less than the goal at alternator duty cycle and RPM, the method advances to block 74 whereby the alternator field current through field winding 15 is incremented.

Returning to decision block 96, if the method determines that the current of field winding 15 is at maximum level, or alternator voltage is at a set limit, the method falls to decision block 94. In this block the change in the manifold absolute pressure (MAP) or automatic idle speed (AIS) is tested to determine if either is greater than a set point value. If neither is greater than the set point value, the method advances to block 92. In block 92 the method determines that the electrically heated catalyst 22 is open circuited. The method then falls to block 90 where power is cut off to the electrically heated catalyst 22. The method then returns, in block 60, to perform other engine control tasks. If, in block 94 it is determined that either the MAP or AIS is greater than a set point value, the method falls through to block 84.

In block 84 the temperature for the electrically heated catalyst 22 is measured via the thermistor 24 or implied. The methodology then advances to block 82 whereby a counter time is incremented. The method then continues to decision block 80. In this block the method determines whether the heating of the catalyst has reached a set time or temperature limit. If both conditions are not true, the method advances to block 84. If, however, either condition in block 80 is true, the method continues to block 78.

In execution block 78, the field of the alternator is reduced by the field control output 34 of ECU 12. The method then advances to decision block 76. In this block the method determines if the alternator voltage is less than a set point. If the answer is in the negative, the method falls to block 78 and the field winding current is reduced. If, however, the alternator voltage is less than a set point, the method advances to block 72. It is in this block that the relay 20 is de-energized. The method then continues to block 58 where voltage regulation is applied to the alternator 14. The method then returns, in block 60, to perform other engine control tasks.

While the invention has been described in detail, it is to be expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. In an exhaust system for a engine including a power source and a plurality of vehicle loads, an apparatus for electrically heating a catalyst, the apparatus comprising:

a multi-phase alternator electrically coupled to the power source, the multi-phase alternator for rectifying AC to DC by a diode rectifier bridge internal to the multi-phase alternator;

means for switching DC from the diode rectifier bridge of the multi-phase alternator to an electrically heated catalyst and cutting off DC supplied to the power source from the multi-phase alternator, the switching means electrically coupled to the multi-phase alternator;

an electrically heated catalytic converter for receiving DC supplied by the multi-phase alternator electrically coupled to the relay means, the catalytic converter including a catalyst for purifying exhaust gases of the engine and a catalyst heating element for bringing the catalytic converter within peak operating temperature;

means for energizing and de-energizing the switching means, the energizing and de-energizing means electrically coupled to the switching means and whereby the multi-phase alternator alternatively supplies DC to the power source and the catalyst heating element of the catalytic converter via the switching means.

2. The apparatus of claim 1 wherein the energizing and de-energizing means comprises an Electronic Control Unit (ECU), the ECU including a microprocessor, memory capabilities, and at least one bus line.

3. The apparatus of claim 2 wherein the multi-phase alternator comprises a three-phase alternator with its phase windings configured in a "Y" connection and having a center tap taken from the common junction of the three-phase windings.

4. The apparatus of claim 3 wherein in the switching means consists of a power relay for transferring power from the multi-phase alternator to the electrically heated catalyst.

5. The apparatus of claim 3 wherein the switching means comprises a transistor for transferring power from the multi-phase alternator to the electrically heated catalyst.

6. The apparatus of claim 2 wherein the multi-phase alternator comprises a three-phase alternator with its phase windings configured in a "DELTA" connection and wherein each terminal of each winding is connected to an end of a different winding.

7. The apparatus of claim 6 wherein in the switching means consists of a power relay for transferring power from the multi-phase alternator to the electrically heated catalyst.

8. The apparatus of claim 6 wherein the switching means comprises a transistor for transferring power from the multi-phase alternator to the electrically heated catalyst.

9. In an exhaust system of a engine including a power source and a plurality of vehicle loads, an apparatus for electrically heating a catalyst, the apparatus comprising:

a multi-phase alternator electrically coupled to the power source, the multi-phase alternator rectifying AC to DC by a diode rectifier bridge internal to the multi-phase alternator;

similar means for switching DC from the diode rectifier bridge of the multi-phase alternator to an electrically heated catalyst and cutting off DC supplied to the power source from the multi-phase alternator, the switching means electrically coupled to the multi-phase alternator;

an electrically heated catalytic converter for receiving DC supplied by the multi-phase alternator electrically coupled to the singular switching means, the catalytic converter including a catalyst for purifying exhaust gases of the engine and a heating element for bringing the catalytic converter expediently within peak operating temperature;

an Electronic Control Unit (ECU), the ECU including a microprocessor, memory capabilities, and at least one bus line for energizing and de-energizing the singular switching means, the ECU electrically coupled to the singular switching means;

a temperature sensor in close proximity to the catalytic converter heating element for reading a temperature of the heating element and having outputs, the temperature sensor outputs in communication with the ECU and for imparting an electrical signal representation of the catalyst temperature to the ECU; and whereby the multi-phase alternator alternatively supplies DC to the power source and the catalyst heating element of the catalytic converter via the singular switching means.

10. The apparatus of claim 9 wherein the switching means consists of a power relay for transferring power from the multi-phase alternator to the electrically heated catalyst.

11. The apparatus of claim 10 wherein the temperature sensor is a thermistor.

12. The apparatus of claim 9 wherein the relay means comprises a transistor for transferring power from the multi-phase alternator to the electrically heated catalyst.

13. The apparatus of claim 12 wherein the temperature sensor is a thermistor.

14. In a engine and associated catalyst performance control system having an Electronic Control Unit (ECU), the ECU including a microprocessor, memory capabilities, and at least one bus line, a battery, a multi-phase alternator, an electrically heated catalyst, and a relay connecting the multi-phase alternator and catalyst, a method for heating an electrically heated catalyst to a desired temperature, the catalyst disposed within an exhaust chamber of the engine, the method comprising the steps of:

determining when a minimum engine RPM is reached and a battery voltage is above a minimum threshold;

energizing a relay coil for cutting off a current path from the alternator power output to the battery such that all output power from the multi-phase alternator is provided to the electrically heated catalyst;

increasing in graduated steps the output power from the multi-phase alternator;

monitoring a voltage across the electrically heated catalyst to determine whether the voltage is within a specified range;

terminating the current methodology if the electrically heated catalyst voltage is not within the specified range and storing a fault code in ECU memory to indicate a shorted electrically heated catalyst;

comparing an engine load before and after ramping the output power of the alternator to determine whether an open electrically heated catalyst circuit has occurred;

terminating the current methodology if the electrically heated catalyst voltage is not within the specified range and storing a fault code in ECU memory to indicate the open electrically heated catalyst circuit;

providing a current path from the multi-phase alternator power output to the battery for a specified time such that all output power from the multi-phase alternator is provided to the electrically heated catalyst if a short or open catalyst circuit has not occurred;

limiting the voltage of the electrically heated catalyst to a specified level by controlling a duty cycle of the multi-phase alternator;

determining whether heater voltage, battery voltage, and engine RPM falls below a specified range;

terminating the current methodology if the heater voltage, battery voltage, and engine RPM falls below the specified range and storing a fault code in ECU memory to indicate the open electrically heated catalyst circuit; and de-energizing the relay coil if the heater voltage, battery voltage, and engine RPM does not fall below the specified range wherein the output power from the multi-phase alternator to the electrically heated catalyst is disconnected and the multi-phase alternator output power to the to the battery and engine loads is connected.

15. The method of claim 14 including the step of determining whether the battery is operational.

16. The method of claim 15 including the step of determining that power is not being provided to the electrically heated catalyst if the battery is not operational.

17. The method of claim 16 including the step of determining whether the coolant temperature is in a high state or a low state.

18. The method of claim 17 including the step of determining that power is not being provided to the electrically heated catalyst if the battery is not operational.

* * * * *